United States Patent
Liang et al.

(10) Patent No.: US 9,284,983 B2
(45) Date of Patent: Mar. 15, 2016

(54) RACEWAY ELEMENT FOR A LARGE ROLLER BEARING AND BEARING ASSEMBLY

(75) Inventors: Baozhu Liang, Dittelbrunn (DE); Ulrike May, Gochsheim (DE); Gerhard Wagner, Prichsenstadt (DE); Claus Rumpel, Werneck (DE)

(73) Assignee: AKTIEBOLAGET SKF, Gothenburg (SE)

(*) Notice: Subject to any disclaimer, the term of this patent is extended or adjusted under 35 U.S.C. 154(b) by 552 days.

(21) Appl. No.: 13/318,987

(22) PCT Filed: May 6, 2010

(86) PCT No.: PCT/EP2010/002790
§ 371 (c)(1),
(2), (4) Date: Feb. 9, 2012

(87) PCT Pub. No.: WO2010/127860
PCT Pub. Date: Nov. 11, 2010

(65) Prior Publication Data
US 2012/0134616 A1     May 31, 2012

(30) Foreign Application Priority Data

May 6, 2009    (EP) .................................. 09006156

(51) Int. Cl.
*F16C 41/00* (2006.01)
*F16C 33/64* (2006.01)
*F16C 19/16* (2006.01)

(52) U.S. Cl.
CPC ............... *F16C 33/64* (2013.01); *F16C 19/163* (2013.01); *F16C 2300/14* (2013.01)

(58) Field of Classification Search
CPC .......... F16C 33/62; F16C 33/12; F16C 33/64; F16C 2223/10; F16C 2223/18; F16C 2300/14
USPC .......... 384/325, 912, 913, 569, 492; 29/898.12–898.15, 898.066, 898.067, 29/898.047, 898.059; 205/224–228; 428/681–685; 148/320, 334; 420/8, 420/105
See application file for complete search history.

(56) References Cited

U.S. PATENT DOCUMENTS

| | | |
|---|---|---|
| 2,199,096 A | 4/1940 | Berglund |
| 2,585,372 A | 2/1952 | Day et al. |

(Continued)

FOREIGN PATENT DOCUMENTS

| | | |
|---|---|---|
| DE | 10228333 C1 | 9/2003 |
| JP | 2003193139 A | 7/2003 |

(Continued)

OTHER PUBLICATIONS

Machine Translation of WO 2007125651.*

(Continued)

*Primary Examiner* — Richard W Ridley
*Assistant Examiner* — Yamilka Pinero Medina
(74) *Attorney, Agent, or Firm* — Bryan Peckjian; SKF USA Inc. Patent Dept.

(57) ABSTRACT

A roller bearing element for a large roller bearing includes the following features: at least one contact zone for a roller bearing counter element, the contact zone has an induction-hardened surface layer, the roller bearing element is comprised of a steel, which includes an admixture of carbon of at least 0.46 mass %.

5 Claims, 1 Drawing Sheet

(56) References Cited

U.S. PATENT DOCUMENTS

| | | | |
|---|---|---|---|
| 2,786,788 A | | 3/1957 | Anderson |
| 3,113,862 A | | 12/1963 | Harvey et al. |
| 5,725,690 A | * | 3/1998 | Ochi et al. .................... 148/320 |
| 8,252,129 B2 | | 8/2012 | Gay et al. |
| 8,753,565 B2 | | 6/2014 | Caballero |
| 2005/0160602 A1 | * | 7/2005 | Shibata et al. ........... 29/898.066 |
| 2009/0052823 A1 | | 2/2009 | Komori et al. |
| 2010/0239202 A1 | * | 9/2010 | Kuroda et al. ................ 384/512 |

FOREIGN PATENT DOCUMENTS

| | | |
|---|---|---|
| JP | 2007297676 A | 11/2007 |
| JP | 2007327112 A | 12/2007 |
| WO | WO2006087152 A2 | 8/2006 |
| WO | WO 2007125651 * 11/2007 | ............. B60B 35/02 |

OTHER PUBLICATIONS

Totten, George E. "Steel Heat Treatment: Metallurgy and Technologies", 2007, p. 186, CRC Press, Boca Raton, FL.*

Dossett, J (Mar./Apr. 2007) Make Sure Your Specified Heat Treatment is Achievable. Heat Treating Progress. Retrieved from http://www.asminternational.org/documents/10192/1910305/htp00702p023.pdf/487b3b8e-02ba-4b06-ab31-3293aa2c3e77.*

Totten, George E. "Steel Heat Treatment: Metallurgy and Technologies," 2007, p. 185, CRC Press, Boca Raton, FL.

* cited by examiner

RACEWAY ELEMENT FOR A LARGE ROLLER BEARING AND BEARING ASSEMBLY

CROSS-REFERENCE

This application is the U.S. national stage of International Application No. PCT/EP2010/002790 filed on May 6, 2010, which claims priority to European patent application no. 09 006 156.5 filed on May 6, 2009.

TECHNICAL FIELD

The present invention relates to a raceway element for a large roller bearing and to a bearing assembly.

RELATED ART

In roller bearings known today, generally speaking, the raceway elements are manufactured from case- and through-hardened steel. When using case-hardened steel, a surface layer of the low-alloy steel is carburized in a carbon atmosphere, so that it can be supplementally hardened. For large roller bearings, due to the continuous load on the raceway elements by the circulating roller bodies, it is necessary to achieve a high surface hardness in the area of the raceways, in order to be able to ensure a long service life. However, the case- or through-hardening of the raceway elements is associated with a relatively high consumption of energy.

In slewing bearings, it is well known to generate hardened surface layers by using induction methods. In such bearings, however, the requirements for the surface hardness are not as high as in large roller bearings due to the different type of loading by the roller bodies. Typically, other types of steel are employed in slewing bearings than in large roller bearings. Therefore, the induction hardening methods known for these types of bearings can not be utilized in the manufacture of large roller bearings.

In smaller roller bearing diameters, it is also known to use induction surface layer hardening for the grades of steels utilized therein, such as, e.g., 100Cr6. The known methods for induction hardening of surface layers also can not be utilized in large roller bearings due to economic considerations.

SUMMARY

In one aspect of the present teachings, a roller bearing element for a large roller bearing and a corresponding large roller bearing assembly are disclosed, in which a long service life is ensured with a simultaneously simple production.

In another aspect of the present teachings, a roller bearing element for a large roller bearing preferably includes the following features:
- at least one contact zone for a roller bearing counter element,
- the contact zone has an induction-hardened surface layer, and
- the roller bearing element is comprised of a steel, which includes an admixture of carbon of at least 0.46 mass %.

In contrast to the cost-intensive usage of case-hardened steel, which generally has a content of less than 0.2 mass % carbon outside of the surface layer and can be sufficiently hardened for usage in highly-loaded roller bearings only by expensive carburization in the surface layer to a content of, e.g., 0.8 mass % carbon in this layer, here a less-expensive, so-called hardenable steel having an admixture of carbon of at least 0.46 mass % can be utilized, wherein the contact zone of the roller bearing elements is supplementally hardened by an induction method. This hardening method is associated with a considerably reduced expense in comparison to the carburization of the surface layer. In particular, the raceway elements and/or the roller bodies of the large bearing can be formed as roller bearing elements according to the invention. In particular, the elements of the large bearing loaded by roller contact profit by the inventive embodiment. In this respect, the roller bearing counter element is the roller bearing element that is in roller contact with the roller bearing element and is also preferably formed according to the invention. The large roller bearing preferably has a diameter of at least 250 mm.

The invention is principally based on the recognition that, for carbon contents lower than 0.46 mass %, the induction hardening of the surface layers does not achieve an sufficient surface hardness with a sufficiently-stable microstructure for ensuring a sufficiently-long service life of the raceway element. Especially for a low carbon content in the surface layer, a disadvantageously-instable microstructure can result from induction hardening, which leads to a premature failure of the roller bearing element and thus the large roller bearing. Especially for large roller bearings, this results in the fact that a no longer negligible distortion of the material occurs during the heat treatment, so that a high running precision along the raceway is no longer ensured for the roller bodies. The distortion must be eliminated again after the heat treatment by another, e.g., cutting processing, which drives up the production costs for the corresponding raceway elements. Also, after the cutting operation, i.e. the removal of material from the surface, it must be ensured, however, that the maximal hardness of the surface corresponds to the construction of the large bearing selected according to the expected load, so that the necessary load bearing capacity is provided. In this respect, the thickness of the surface layer must be chosen to be larger, especially for highly-loaded large bearings than for smaller bearing dimensions.

In a preferred embodiment of the invention, the surface layer has a maximum hardness that is less than the maximum achievable hardness of the steel that is utilized. A considerably higher hardness can generally be achieved with the utilized steel than with the steels known to be utilized in large bearings, such as e.g., 42CrMo4. Nevertheless, this advantage is preferably not utilized and simply, a hardness is generated by the induction hardening method that corresponds the hardness for known roller bearing elements made of 42CrMo4 for large bearings. As a result, the steel utilized according to the invention is not brought to its material limits during hardening, as is often the case when using 42CrMo4. As a result, a maximum hardness comparable to known large bearings results in the surface layer; however a different hardness progression results with increased depth. Whereas for known grades of steel for large bearings the hardness sharply decreases after a comparably thin surface layer and quickly transitions into the hardness of the not-hardened portion, a considerably flatter transition is achieved with the steel utilized according to the invention. Consequently, the hardened surface layer reaches considerably deeper into the roller bearing element with decreasing hardness than for known large bearings. At the same time, a relatively fine and stable microstructure is thereby produced. On the one hand, this results in a considerably increased service life of the large bearing. On the other hand, a considerably more simple and material-friendly process is required when using higher hardenable steel having more than 0.46 mass % of carbon, so that the steel is less stressed. For example, it can be that the steel must be heated less high and is quenched less quickly, in order to exhibit the desired flat hardness progression.

In advantageous embodiments of the invention, it should be noted that the load bearing capacity of the hardened layer and thus its depth covers the stress progression generated by the Hertzian contact with the roller bearing counter elements. The stress decreases with increasing depth. Consequently, the thickness of the hardened layer must be matched to the expected load on the bearing, which is performed by generating thicker surface layers for higher to-be-expected loads, i.e. a deeper-acting stress progression, than for lower loads.

In an advantageous embodiment of the invention, the steel includes admixtures of manganese, chrome and/or molybdenum. In particular, admixtures of these alloy elements provide a steel, which can be induction hardened well, and provide both a sufficient hardened depth and a suitable microstructure for a high load bearing capacity and a long service life of the raceway element. It is especially advantageous if the steel includes an admixture of molybdenum of at least 0.12 mass %. The advantageous hardenability can no longer be increased above a molybdenum content of 0.35 mass %, which means that the admixture preferably lies in the range of 0.12 to 0.35 mass %.

In an advantageous embodiment of the invention, the hardened surface layer has a maximum hardness of at least 58 HRC. Especially above this surface hardness, the raceway element has a sufficiently-stable raceway in order to ensure a long service life.

Further advantages and embodiments of the invention result from the embodiments described in the following in connection with the appended Figures.

DETAILED DESCRIPTION OF THE INVENTION

Figure 1:
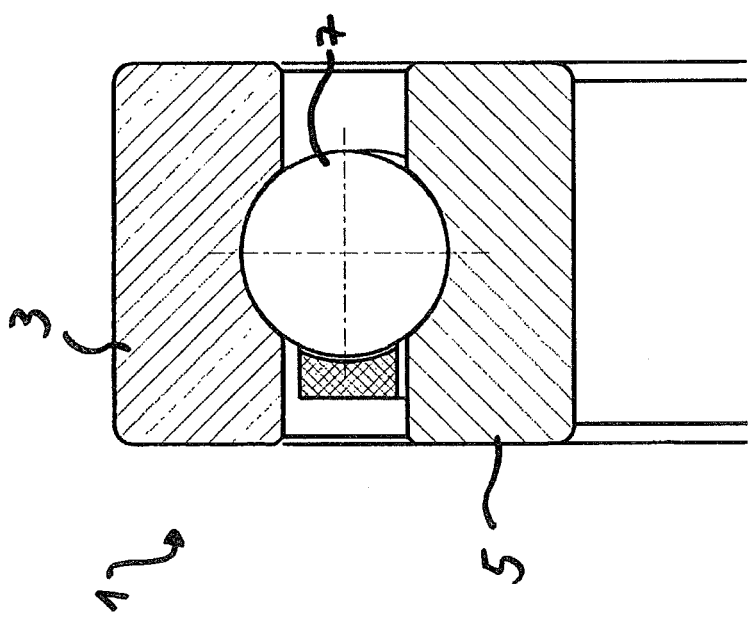
FIG. 1 discloses a representative roller bearing according to the present teachings.

According to one embodiment of the invention, a large roller bearing 1 having a diameter of at least 250 mm is depicted in FIG. 1. The large roller bearing comprises two raceway elements, which are embodied as outer ring 3 and as inner ring 5. Roller bodies embodied as balls 7 are disposed between the raceway elements. During movement of the two raceway elements, a rolling movement of the balls 7 on the raceway elements occurs. The large roller bearing is typically utilized in installation situations, in which a continuous circling rotation of the outer ring 3 relative to the inner ring 5 takes place or vice versa. This can be the case, e.g., in a wind turbine.

Figure 3:
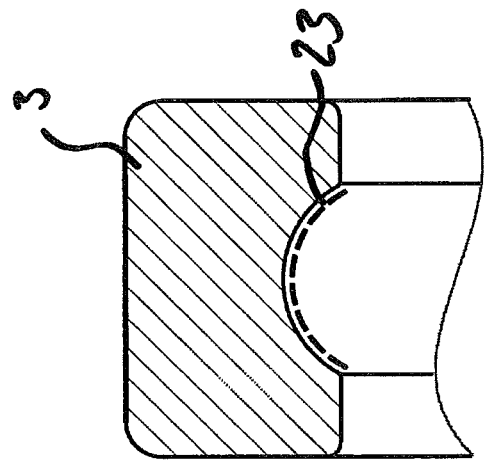
FIG. 3 discloses a representative outer bearing ring according to the present teachings.
Figure 2:
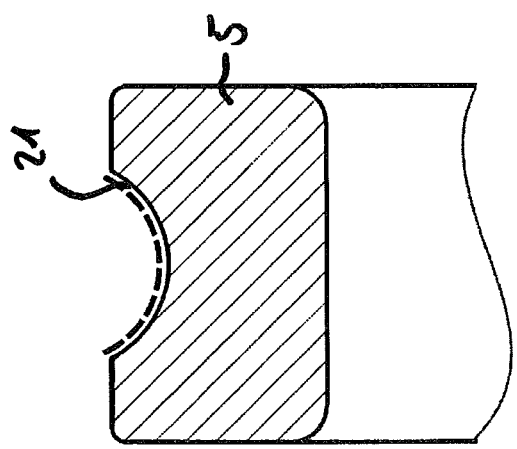
FIG. 2 discloses a representative inner bearing ring according to the present teachings.

In FIG. 2, the inner ring 5 is illustrated in a cut-out view. It includes a raceway 21, on which the balls 7 roll during operation of the large roller bearing 1. The raceway 21 has a hardened surface layer that can withstand the loads due to the contact with the calls 7 and ensures a long service life of the large roller bearing. The same applies to the outer ring 3 illustrated in FIG. 3, which also has a surface-hardened raceway 23.

The surfaces of the raceways 21 and 23 are continually loaded by the rolling contact with the roller bodies. The bearing rings are comprised of a steel that includes an admixture of carbon of 0.46 to 1.0 mass % and an admixture of molybdenum of 0.12 to 0.35 mass %. Further admixtures are preferably manganese between 0.5 and 1.0 mass % and/or chrome between 0.9 and 1.5 mass %. Appropriate materials are known whose usage for the manufacture of raceway elements having corresponding induction-hardening of the surface layer provides an inexpensive and thus simplified manufacturing method as compared to known raceway elements for large roller bearings. The steel can correspond, e.g., to the specification 50CrMo4, whereas 42CrMo4 is mainly utilized in known large bearings.

After being shaped, the raceways of the bearing rings are hardened by an induction method. For example, an inductor is guided closely over the raceway, whereby the raceway is heated. This leads to a phase transformation, wherein an especially hard material is formed. The heated material is quenched by a subsequent spraying, so that the hardened structure is maintained. This induction hardening method is preferably carried out in a slip-free manner according to known methods, so that no non-hardened zone results on the raceway. The raceway thus has the same hardness along the entire raceway element in accordance with technical manufacturing tolerances.

The maximum hardness of the surface layer is at least 58 HRC. This hardness can be achieved with grades of steel that are also known for usage in bearings. However, to achieve this minimum hardness, these grades of steel must be hardened up to the limits of their material-specific properties. With the steel utilized herein, a considerably higher maximum hardness of the surface layer than 58 HRC can, in principle, be achieved. However, this hardness is not required in most applications for large bearings. In this respect, the steel for achieving the hardness of 58 HRC is considerably less stressed relative to its material possibilities than types of steel known for this intended use. In this respect, a clearly material-friendly method of hardening is possible for achieving the desired hardness in comparison to manufacturing methods known to be used for components of large bearings. Therefore, the maximum temperature during hardening is less and also the quenching can take place with smaller temperature gradients, whereby a flatter transition of the hardness between the surface layer and the base microstructure also results. The material-friendly process leads, in particular, to a better reproducibility of the results.

The induction hardening method is carried out such that the depth of the hardened layer corresponds to the requirements for the service life of the bearing. In particular, the depth of the hardened layer is selected such that a stress progression generated by the Hertzian contact with the roller bodies is covered. The hardened layer thus reaches deeper into the material than the stress, which is generated by the roller contact, exceeds the load carrying capacity of the not-hardened base material. Therefore, overloadings of the base material are excluded; the increased stress and load are absorbed by the surface layer. A long service life of the large bearing thereby results. Moreover, the surface layer has a suitable microstructure for a high load bearing capacity of the bearing.

In another exemplary embodiment of the invention, the roller bodies are embodied according to the invention in addition to the raceway elements, i.e. they are hardened by an induction method and are comprised of a corresponding steel. In the alternative, an exemplary embodiment of the invention is also possible, in which only the roller bodies are formed according to the invention, not however the raceway elements. Consequently, the invention can be advantageously utilized for all components of a roller bearing that are loaded by the roller contact. Moreover, the invention is not limited to roller bearings with balls as roller bodies, but is also applicable, in principle, to all types of large roller bearings.

REFERENCE NUMBER LIST

1 Large roller bearing
3 Outer ring
5 Inner ring
7 Ball
21, 23 Raceway

The invention claimed is:

1. A roller bearing element for use in a large roller bearing with an outer diameter of at least 250 millimeters, comprising:
   at least one contact zone configured to contact a counter element of the roller bearing,
   wherein:
   the contact zone has an induction-hardened surface layer,
   the roller bearing element is comprised of a steel, which includes an admixture of carbon of at least 0.46 mass %, and
   a maximum hardness of the induction-hardened surface layer is less than a maximum hardness of the steel,
   wherein the steel contains an admixture of molybdenum, and
   wherein the steel is 50CrMo4 and wherein the maximum hardness of the surface layer is substantially equal to a maximum hardness of 42CrMo4.

2. The roller bearing element according to claim 1, wherein the hardened surface layer has a sufficient thickness such that a stress progression generated by Hertzian contact with the roller bearing counter element is covered.

3. A method, comprising:
   forming at least one component of a roller bearing selected from an outer ring, an inner ring and a roller body from a steel having a carbon content of at least 0.46 mass % and containing an admixture of molybdenum, the roller bearing having an outer diameter of at least 250 millimeters, and
   induction hardening at least one contact surface of the at least one component such that a maximum hardness of the at least one contact surface is less than a maximum hardness of the steel,
   wherein the steel is 50CrMo4 and wherein hardening the at least one contact surface comprises hardening the at least one contact surface such that the hardness of the at least one contact surface is substantially equal to a maximum hardness of 42CrMo4.

4. The method according to claim 3, wherein:
   the outer ring has an outer diameter of at least 250 millimeters.

5. A method, comprising:
   providing a steel having a carbon component of at least 0.46 mass % and having a maximum hardness;
   forming at least one component of a roller bearing selected from an outer ring, an inner ring and a roller body from the steel; and
   induction hardening at least one contact surface of the at least one component to a hardness that is less than the maximum hardness,
   wherein the steel is 50CrMo4 and wherein induction hardening the at least one contact surface comprises induction hardening the at least one contact surface to a hardness that is substantially equal to a maximum hardness of 42CrMo4.

* * * * *